US008812380B2

(12) United States Patent
Murray et al.

(10) Patent No.: US 8,812,380 B2
(45) Date of Patent: Aug. 19, 2014

(54) TAX-RETURN PREPARATION SYSTEMS AND METHODS

(75) Inventors: David Kord Murray, Carlsbad, CA (US); Sarah Ann Lindquist, Overland Park, KS (US); Charles Christopher Whelan, Hull, MA (US)

(73) Assignee: HRB Digital LLC, Kansas City, MO (US)

( * ) Notice: Subject to any disclaimer, the term of this patent is extended or adjusted under 35 U.S.C. 154(b) by 1195 days.

(21) Appl. No.: 11/838,761

(22) Filed: Aug. 14, 2007

(65) Prior Publication Data
US 2008/0059900 A1 Mar. 6, 2008

Related U.S. Application Data

(63) Continuation-in-part of application No. 11/334,033, filed on Jan. 17, 2006, and a continuation-in-part of application No. 11/334,730, filed on Jan. 17, 2006, and a continuation-in-part of application No. 11/334,032, filed on Jan. 17, 2006.

(60) Provisional application No. 60/822,334, filed on Aug. 14, 2006, provisional application No. 60/644,328, filed on Jan. 14, 2005.

(51) Int. Cl.
| | |
|---|---|
| G06F 17/22 | (2006.01) |
| G06F 3/0482 | (2013.01) |
| G06F 9/44 | (2006.01) |
| G06F 3/0483 | (2013.01) |
| G06Q 50/26 | (2012.01) |
| G06Q 40/02 | (2012.01) |
| G06Q 50/18 | (2012.01) |
| G06Q 40/00 | (2012.01) |

(52) U.S. Cl.
CPC .......... *G06F 3/0482* (2013.01); *G06F 9/4446* (2013.01); *G06F 3/0483* (2013.01); *G06Q 50/26* (2013.01); *G06Q 40/02* (2013.01); *G06Q 50/18* (2013.01); *G06Q 40/123* (2013.03)
USPC ........................................................ 705/31

(58) Field of Classification Search
CPC .................................................. G06Q 40/123
USPC ...................................... 705/36 T, 35–40, 31
See application file for complete search history.

(56) References Cited

U.S. PATENT DOCUMENTS 7,234,103 B1 * 6/2007 Regan ........................... 715/234
7,240,297 B1 * 7/2007 Anderson et al. ............. 715/854

(Continued)

OTHER PUBLICATIONS

"Guide to Desktop Tax Software" Tony Lima, PCWorld Feb. 4, 2004.*

*Primary Examiner* — Thomas M Hammond, III
(74) *Attorney, Agent, or Firm* — Erise IP, P.A.

(57) ABSTRACT

In an embodiment of the invention, a tax preparation method is implementable in an electronic system coupled to an electronic device, which is, in turn, coupled to a display device. A web page displayable on the display device is served to the electronic device. The displayed web page includes a user interface, which, in turn, includes a tab bar, with a plurality of tabs. In each tab at least one accordion is present. In each of the accordions there preferably exists at least one text box for explaining or receiving tax information, having a title, an input box and a flyout, the flyout providing tax assistance information to a the user. Once a desired amount of the text boxes have been completed and a completed tax document has been developed, a tax return may be filed with a government agency.

14 Claims, 10 Drawing Sheets

(56) References Cited

U.S. PATENT DOCUMENTS

| | | | |
|---|---|---|---|
| 7,330,852 B2 * | 2/2008 | Bailey et al. | 707/10 |
| 7,860,763 B1 * | 12/2010 | Quinn et al. | 705/31 |
| 8,281,285 B2 * | 10/2012 | Ruehle | 717/120 |
| 2002/0013747 A1 * | 1/2002 | Valentine et al. | 705/31 |
| 2002/0111888 A1 * | 8/2002 | Stanley et al. | 705/31 |
| 2004/0225581 A1 * | 11/2004 | Wyle et al. | 705/31 |

* cited by examiner

1 Welcome  2 Personal  3 Income  4 Deductions  5 Credits  6 State  7 Finish
                       $63,303.21

▼ Expand All — 305

Income Check List

Wages, Salary or Tips (W-2)

Enter the amounts as they appear on your W-2 form.

| | | |
|---:|---:|:---|
| Control number | a. | ☐ |
| Employer identification number | b. | ☐ ⓘ |
| Employer name | c. | ☐ |
| Employer address | c. | ☐ |
| Employer city / State / ZIP Code | c. | ☐ ☐ ☐ |
| | | |
| Wages, tips, other compensation | 1. | ☐ |
| Federal income tax withheld | 2. | ☐ |
| Social security wages | 3. | ☐ |
| Social security tax withheld | 4. | ☐ |
| Medicare wages and tips | 5. | ☐ |
| Medicare tax withheld | 6. | ☐ |
| Social security tips | 7. | ☐ |
| Allocated tips | 8. | ☐ |

Interest Income (1099-INT)

Divident Income (1099-DIV)

Finish Income

TAX-RETURN PREPARATION SYSTEMS AND METHODS

PRIORITY CLAIM

This application claims the benefit of U.S. Provisional Patent Application Ser. No. 60/822,334 filed Aug. 14, 2006 and is a continuation in part of U.S. patent application Ser. No. 11/334,033 filed Jan. 17, 2006, U.S. patent application Ser. No. 11/334,730 filed Jan. 17, 2006, and U.S. patent application Ser. No. 11/334,032 filed Jan. 17, 2006; each of which claim priority to U.S. Provisional Patent Application Ser. No. 60/644,328 filed Jan. 14, 2005; all of which are incorporated by reference herein in their entirety.

FIELD OF THE INVENTION

This invention relates generally to graphical user interfaces and, more specifically, to a user interface enabling a user to prepare a tax return.

BACKGROUND OF THE INVENTION

Many of those who prepare tax returns are familiar with the myriad tax-return-preparation-software products currently available. Typically, these products enable a user to prepare a tax return by leading the user through a series of interview questions that solicit information necessary to prepare the return. Many of these questions are infamous for their tendency to cause the return preparer to be confused about the type and/or amount of data needed to answer the question. While these tax-return products often do provide links to information that can clear up the preparer's confusion, these links invariably require the preparer to transition away from display of the interview question to display of one or more pages of the desired information. Consequently, the preparer may find it difficult or otherwise inconvenient to navigate back to the interview question once the desired information is obtained.

SUMMARY OF THE INVENTION

In an embodiment of the invention, a tax preparation method is implementable in an electronic system coupled to an electronic device, which is, in turn, coupled to a display device. A web page displayable on the display device is served to the electronic device. The displayed web page includes a user interface, which, in turn, includes a tab bar with a plurality of tabs. In each tab at least one accordion is present. In each of the accordions there preferably exists at least one text box for explaining or receiving tax information, having a title, an input box and a flyout, the flyout providing tax assistance information to a the user. Once a desired amount of the text boxes have been completed and a completed tax document has been developed, a tax return may be filed with a government agency.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

An embodiment of the invention may be employed in the commercial 'do it yourself' tax software market as a product targeting those clients who are looking for expertise in their tax return preparation. Tax software also targets segments of tax consumers having more complex tax returns, but looking for easier and more user-friendly solutions in preparing their taxes.

Prior approaches have not significantly changed the interview delivery and/or flow methods consistent with the market today. The disadvantage is that information is fragmented and/or difficult to access. The ability for the consumer to go back and/or easily make changes to the information and/or orient themselves in the process is suboptimal.

The purpose of an embodiment of the invention is to solve significant user problems with both DIY tax prep software as well as user problems from most software programs and/or applications and provide functionality and/or a user interface which provides a significantly different user experience from that available. The basis of the systems and methods as disclosed herein, in terms of interview flow, has the ability to view all information relevant to a topic at a given time. The systems and methods as described herein create a mental model that promotes visual maps within the users understanding which helps them understand their local and/or previous path, and/or where they are going within the application. This application of a mental model is something that prior approaches have failed to adequately address and resolve. An embodiment of the invention introduces a user interface which presents a significantly different connection between the client and the software via usage of a number of functions and/or implementations of communication mechanisms.

Users are oriented throughout the interview via an organization of tabs and/or nested accordions which are explained in more detail below. This facilitates the ability for the user to orient themselves throughout the interview, go back to previously entered information and/or go forward to different portions. In addition, the flow of the interview is modified throughout the experience based off of the responses of the client. Certain questions prompt additional data entry, which may be only propagated if the client answers accordingly. This reduces the time necessary to read unrelated questions and/or streamlines the consumer experience to focus on just those questions that are pertinent to the user. Consumers can see relevant information as they progress through the interview, which is significantly different from other offerings in the market.

Figure 1:
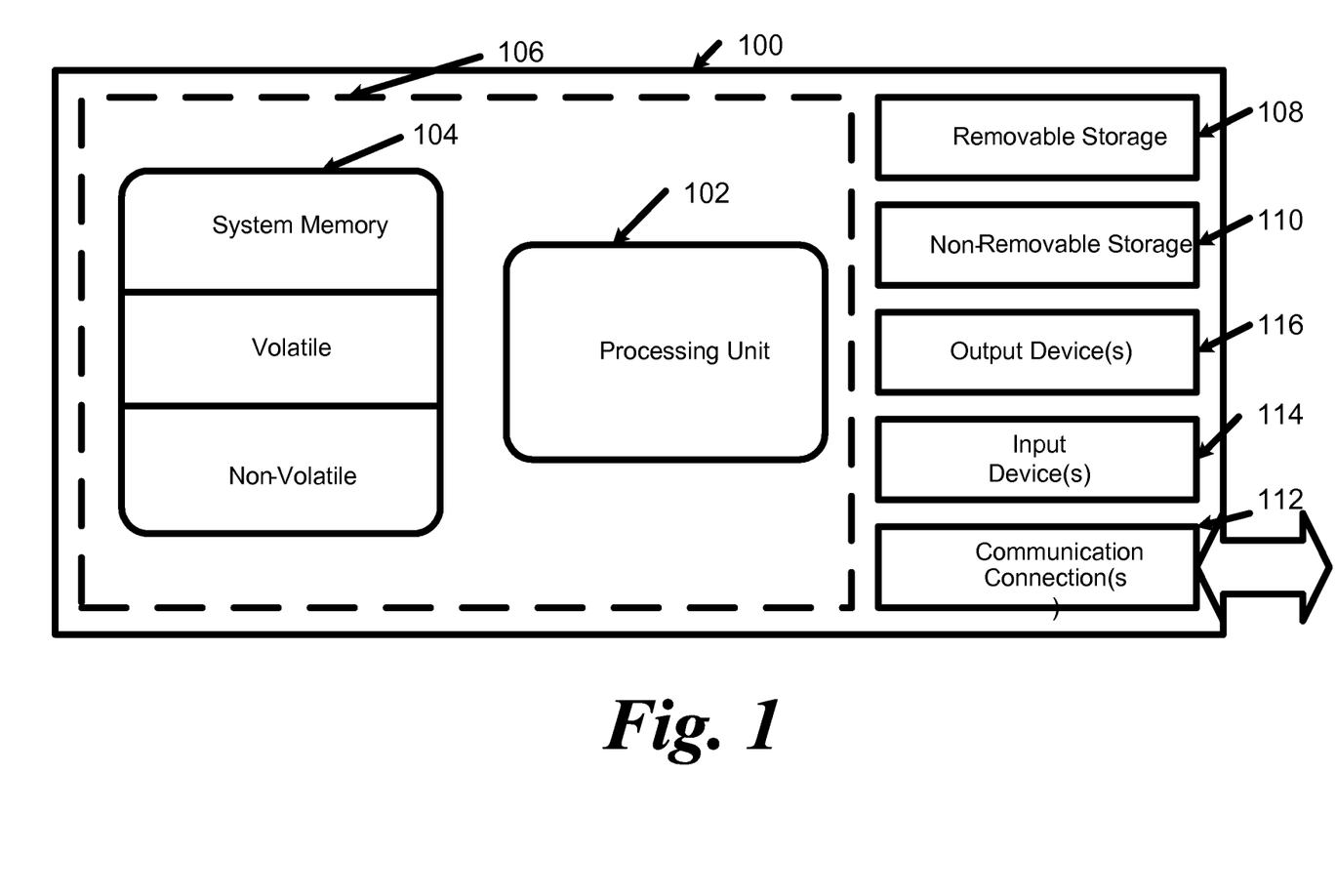
FIG. 1 is a schematic view of an exemplary operating environment in which an embodiment of the invention can be implemented.

FIG. 1 illustrates an example of a computing system environment 100 on which an embodiment of the invention may be implemented. The computing system environment 100, as illustrated, is an example of a suitable computing environment, however it is appreciated that other environments, systems, and devices may be used to implement various embodiments of the invention as described in more detail below.

Embodiments of the invention are operational with numerous other general-purpose or special purpose computing system environments or configurations. Examples of well-known computing systems, environments, and/or configurations that may be suitable for use with embodiments of the invention include, but are not limited to, personal computers, server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

Embodiments of the invention may be described in the general context of computer-executable instructions, such as program modules, being executed by a computer. Generally, program modules include routines, programs, objects, components, data structures, etc. that perform particular tasks or implement particular abstract data types. Embodiments of the invention may also be practiced in distributed-computing environments where tasks are performed by remote processing devices that are linked through a communications network. In a distributed computing environment, program modules may be located in both local and remote computer storage media including memory storage devices.

With reference to FIG. 1, an exemplary system for implementing an embodiment of the invention includes a computing device, such as computing device 100. The computing device 100 typically includes at least one processing unit 102 and memory 104.

Depending on the exact configuration and type of computing device, memory 104 may be volatile (such as random-access memory (RAM)), nonvolatile (such as read-only memory (ROM), flash memory, etc.) or some combination of the two. This most basic configuration is illustrated in FIG. 1 by dashed line 106.

Additionally, the device 100 may have additional features, aspects, and functionality. For example, the device 100 may include additional storage (removable and/or non-removable) which may take the form of, but is not limited to, magnetic or optical disks or tapes. Such additional storage is illustrated in FIG. 1 by removable storage 108 and non-removable storage 110. Computer storage media includes volatile and nonvolatile, removable and non-removable media implemented in any method or technology for storage of information such as computer-readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 100. Any such computer storage media may be part of device 100.

The device 100 may also contain a communications connection 112 that allows the device to communicate with other devices. The Communications connection 112 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, the communication media includes wired media such as a wired network or direct-wired connection, and wireless media such as acoustic, radio-frequency (RF), infrared and other wireless media. The term computer-readable media as used herein includes both storage media and communication media.

The device 100 may also have an input device 114 such as keyboard, mouse, pen, voice-input device, touch-input device, etc. Further, an output device 116 such as a display, speakers, printer, etc. may also be included. Additional input devices 114 and output devices 116 may be included depending on a desired functionality of the device 100.

Figure 2:
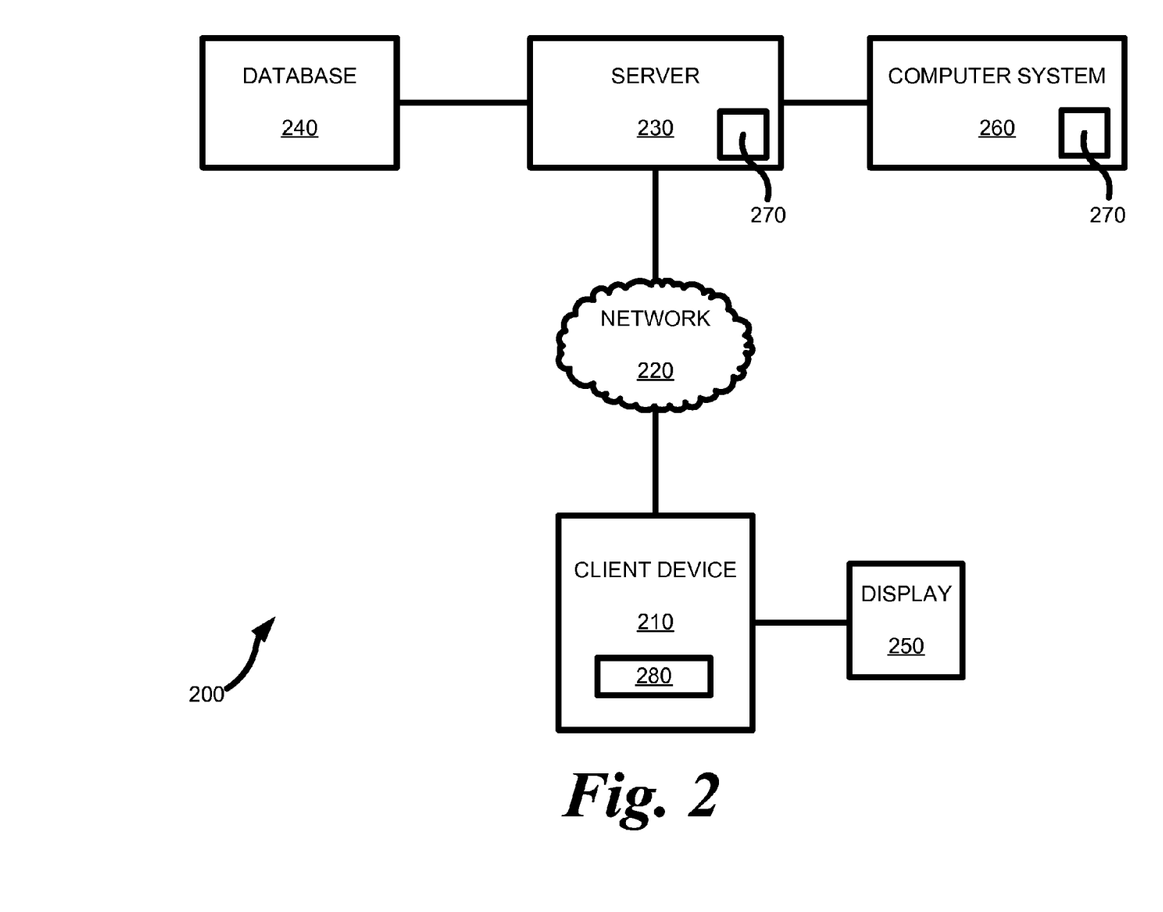
FIG. 2 is a functional block diagram of an exemplary operating environment in which an embodiment of the invention can be implemented.

Referring now to FIG. 2, an embodiment of the present invention takes the form of an exemplary computer network system 200. The system 200 includes an electronic client device 210, such as a personal computer or workstation, that is linked via a communication medium, such as a network 220 (e.g., the Internet), to an electronic device or system, such as a server 230. The server 230 may further be coupled, or otherwise have access, to a database 240 and a computer system 260. Although the embodiment illustrated in FIG. 2 includes one server 230 coupled to one client device 210 via the network 220, it should be recognized that embodiments of the invention may be implemented using one or more such client devices coupled to one or more such servers.

The client device 210 and the server 230 may include all or fewer than all of the features associated with the device 100 illustrated in and discussed with reference to FIG. 1. The client device 210 includes or is otherwise coupled to a computer screen or display 250. The client device 210 may be used for various purposes such as network- and local-computing processes.

The client device 210 is linked via the network 220 to server 230 so that computer programs, such as, for example, a browser, running on the client device 210 can cooperate in two-way communication with server 230. The server 230 may be coupled to database 240 to retrieve information therefrom and to store information thereto. Database 240 may include a plurality of different tables (not shown) that can be used by the server 230 to enable performance of various aspects of embodiments of the invention. Additionally, the server 230 may be coupled to the computer system 260 in a manner allowing the server to delegate certain processing functions to the computer system.

Still referring to FIG. 2, and in operation according to an embodiment of the invention, a user (not shown) of the client device 210 desiring to electronically prepare a tax return uses a browser application running on the client device to access web content served by the server 230.

Still referring to FIG. 2, and in operation according to an embodiment of the invention, a user (not shown) of the client device 210 desiring to electronically prepare a tax return uses a browser application running on the client device to access web content, which may, but need not, be served by the server 230. Specifically, by employing an appropriate uniform resource locator (URL) in a known manner, the user may download from the server 230 and install on the client device 210 a user interface module 280 comprising computer-executable instructions as described more fully hereinafter.

Alternatively, the user may receive the module 280 on a tangible computer-readable medium (not shown), such as, for example, a CD-ROM, and subsequently install the module on the client device 210 from the medium.

Figure 3:
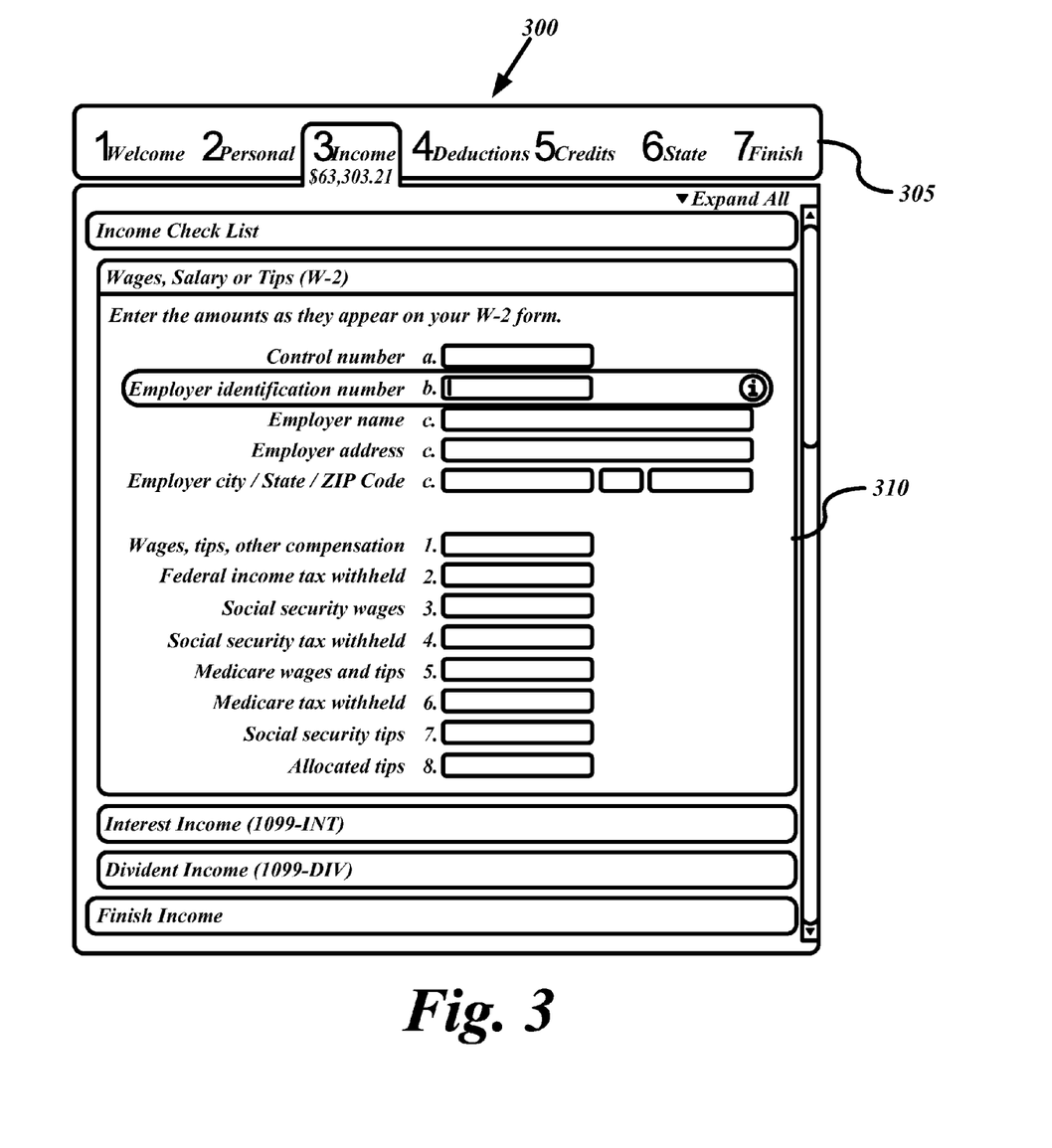
FIG. 3 shows the a interface of an embodiment of the systems and methods described herein.

Upon execution of the module 280 by the client device 210, and referring to FIG. 3, a user interface 300 may be displayed on the display device 250. Features and functionality of the interface 300 are described in commonly owned and co-pending U.S. patent application Ser. No. 11/334,033 filed Jan. 17, 2006, U.S. patent application Ser. No. 11/334,730 filed Jan. 17, 2006, and U.S. patent application Ser. No. 11/334, 032 filed Jan. 17, 2006.

FIG. 3 shows a user interface 300 of an embodiment of the systems and methods described herein. In one embodiment the interface 300 is generally configured for use on the Internet. The interface consists of a tab bar 305, the tab bar 305 being interactive and capable of being selected, using a pointer, by a user. Each tab in the tab bar 305 will be further described in FIG. 4. In the user input screen there is a plurality of accordions 310. The accordions 310 are used to input information from a user into the system. The accordions 310 are further described in FIGS. 5-8.

Figure 4:
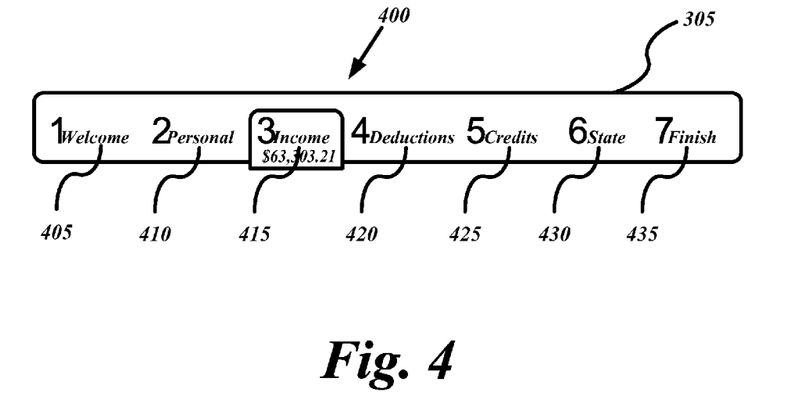
FIG. 4 shows a screenshot of the use of tabs in an embodiment.

FIG. 4 shows a screenshot 400 of the use of tabs in one embodiment. A tab is a high level navigation tool found in a tab bar 305 in one embodiment. Each tab represents a selection covered by the tax preparation system and method. In one embodiment, the tab operates as a container for each of the various tax topics that can logically be grouped together. For example the income tab 415 covers all topics related to income earned, the personal tab 410 contains all personal information necessary to file a tax return, the deductions tab 420 contains all of the deductions that a tax payer my take during the current tax year; the credits tab 425 contains all of the available tax credits in the current tax year; the state tab 430 contains all topics needed to prepare a state return. Also included is a welcome tab 405, which provides a user with general welcome information and a finish tab 435, which provides a user with general closing instructions.

The tabs are activated in a plurality of methods. First, a tab becomes active when a user selects the tab using a computer peripheral pointing device, such as a mouse. The inactive tab is any tab that is not selected and does not show it contents and remains inactive while another tab is presently selected. Finally a hover status, which allows an inactive tab to become active when a mouse hovers over the inactive tab. If a mouse is held over a tab for preferably three to five seconds a click event occurs and that tab is activated.

Figure 5:
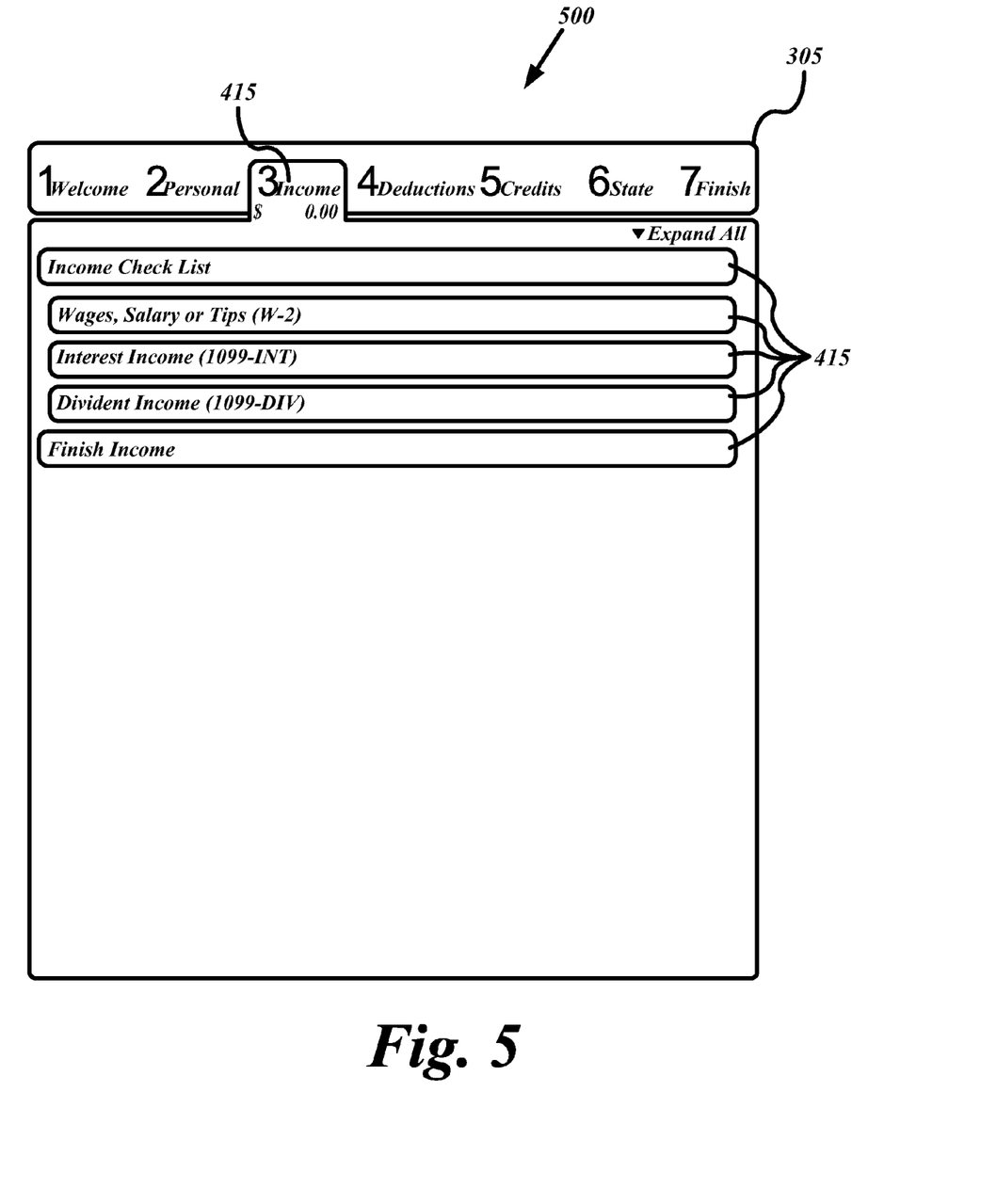
FIG. 5 shows a screenshot of the use of accordions in an embodiment.

FIG. 5 shows a screenshot 500 of the use of accordions in one embodiment. A plurality of closed accordions 505 may be positioned in the income tab 415 located in the tab bar 305. There is a plurality of possible accordions including, but not limited to a gateway accordion, a standard accordion, a nested accordion, and/or a summary accordion. In one embodiment gateway accordions are the mechanisms through which users tell the program what tax topics relate to their respective tax situation. For example a gateway accordion would prompt a user for the amount of W-2's they received in a given year. Then it will produce an appropriate screen for entering all of the W-2 information. A standard accordion is the accordion where most tax interviews will take place. These accordions allow for expansion and data entry. A nested accordion is made up of a standard accordions nested inside of another standard accordion. For example the schedule C interview preferably uses nested accordions because a single business may need to enter many 1099-MISC forms. A summary accordion is preferably the last accordion in all tabs. Summary accordions are advantageous in that they show a synopsis of all information entered in a tab.

Figure 6:
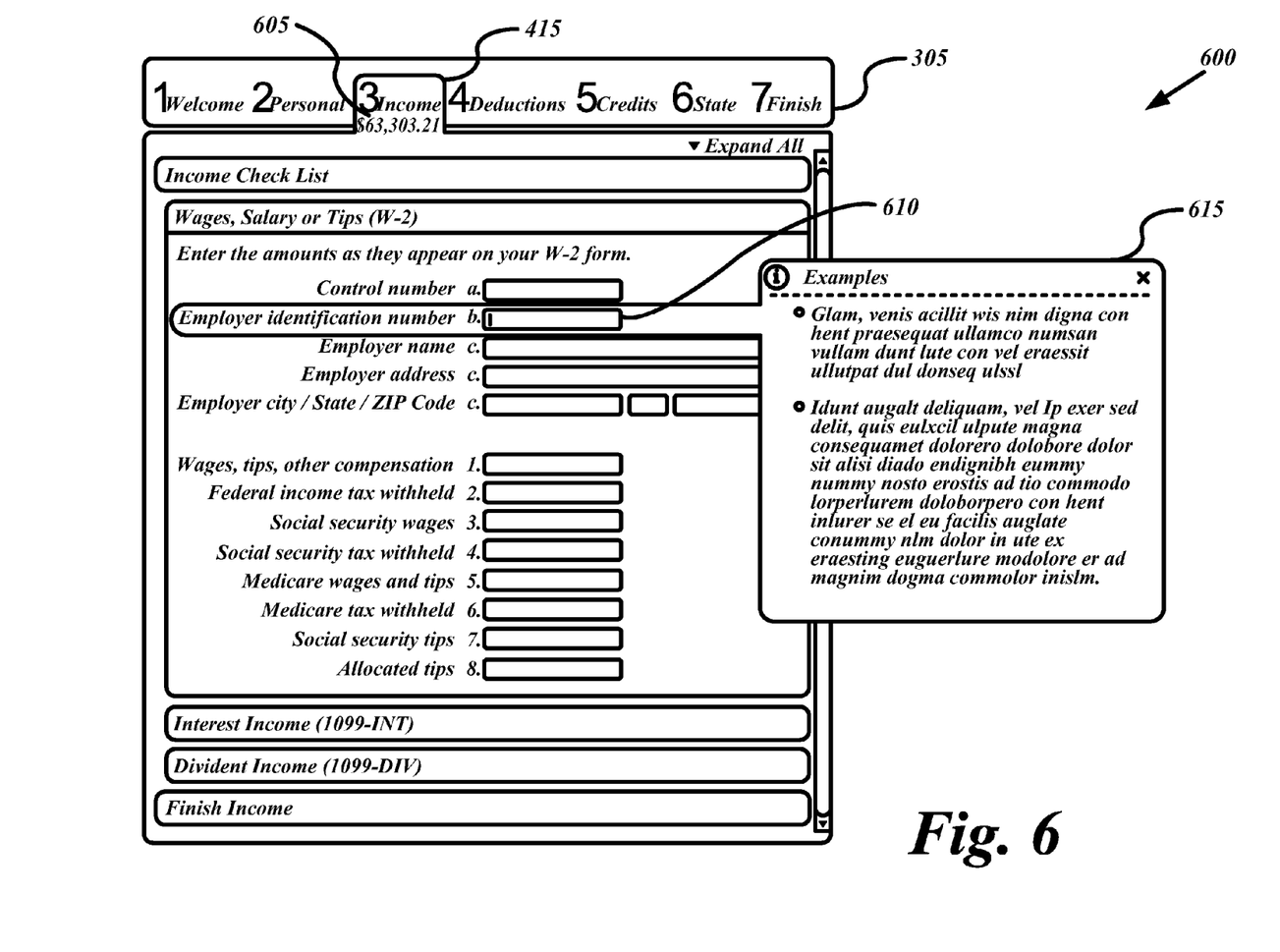
FIG. 6 shows a screenshot of an expanded accordion in an embodiment.

FIG. 6 shows a screenshot 600 of an expanded accordion in one embodiment. When the accordion is opened it contains a plurality of text boxes 610 to allow a user to enter information. The text boxes 610 include a name/title and an input box for a user to enter an input value. When a user has a cursor in a text box, a flyout box 615 is presented that tells the user how to enter the information, shows the user where the information may be found, or provides assistance information. As the information is entered, a summary amount box 605 is displayed on the income tab 415 shown on the tab bar 305. In the illustrated example the user has entered a value of $63,303.21.

Figure 7:
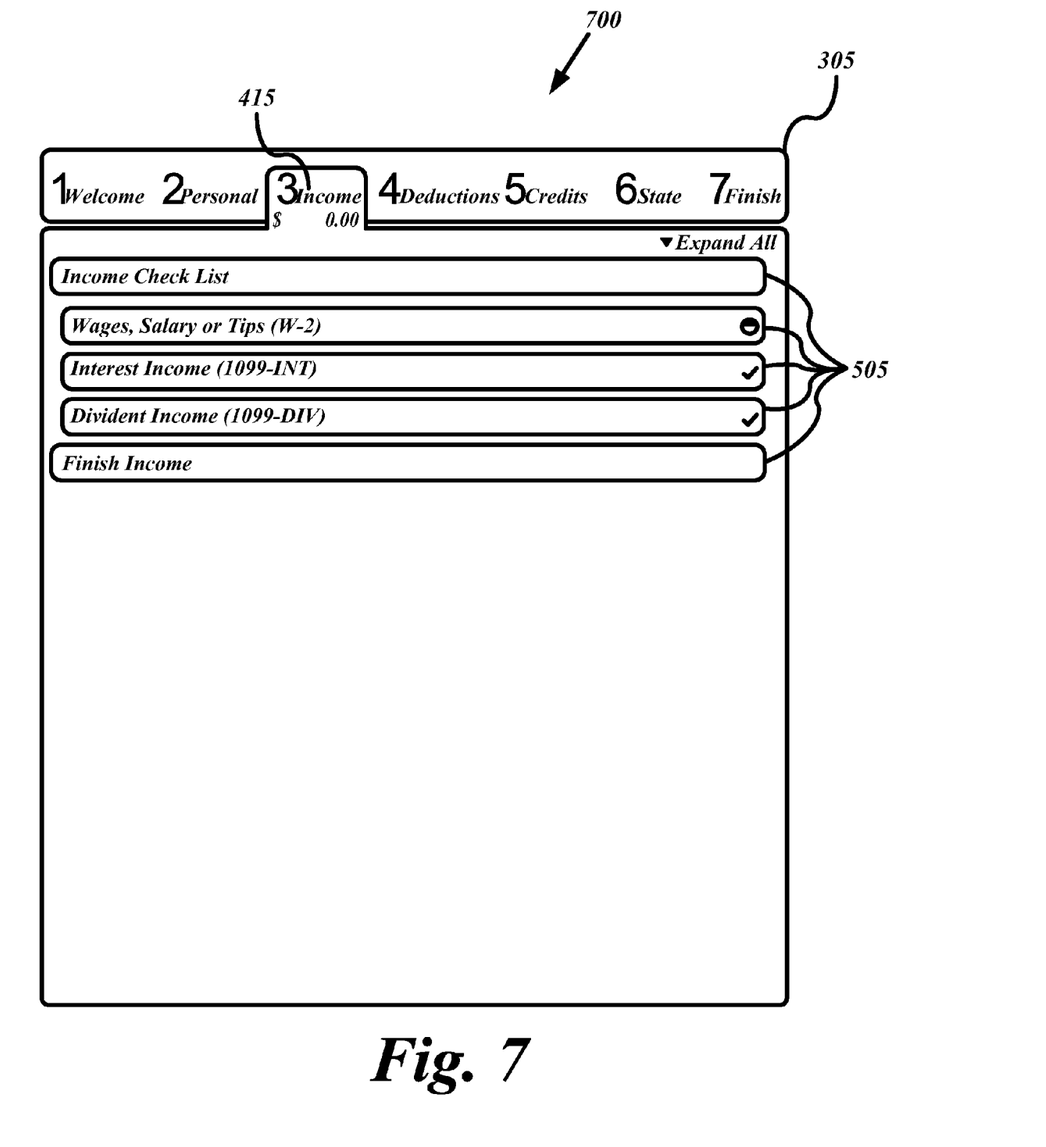
FIG. 7 shows a screenshot of accordions as used in an embodiment.

FIG. 7 shows a screenshot 700 of accordions as used in one embodiment where the accordions 505 are shown as collapsed. However, each of accordions in the income tab have received some amount of information as illustrated by the monetary values within each accordion. The check marks shown represent that an accordion has been sufficiently completed, whereas the circle symbol shows that the accordion has been started but has not been completed. As shown, the monetary values are next to the accordions that produced them and a total or summation value is located within the income tab 415 on the tab bar 305. As each tab is filled in, the monetary value is displayed under the respective tab keeps the user apprised of the current tax status.

Figure 8:
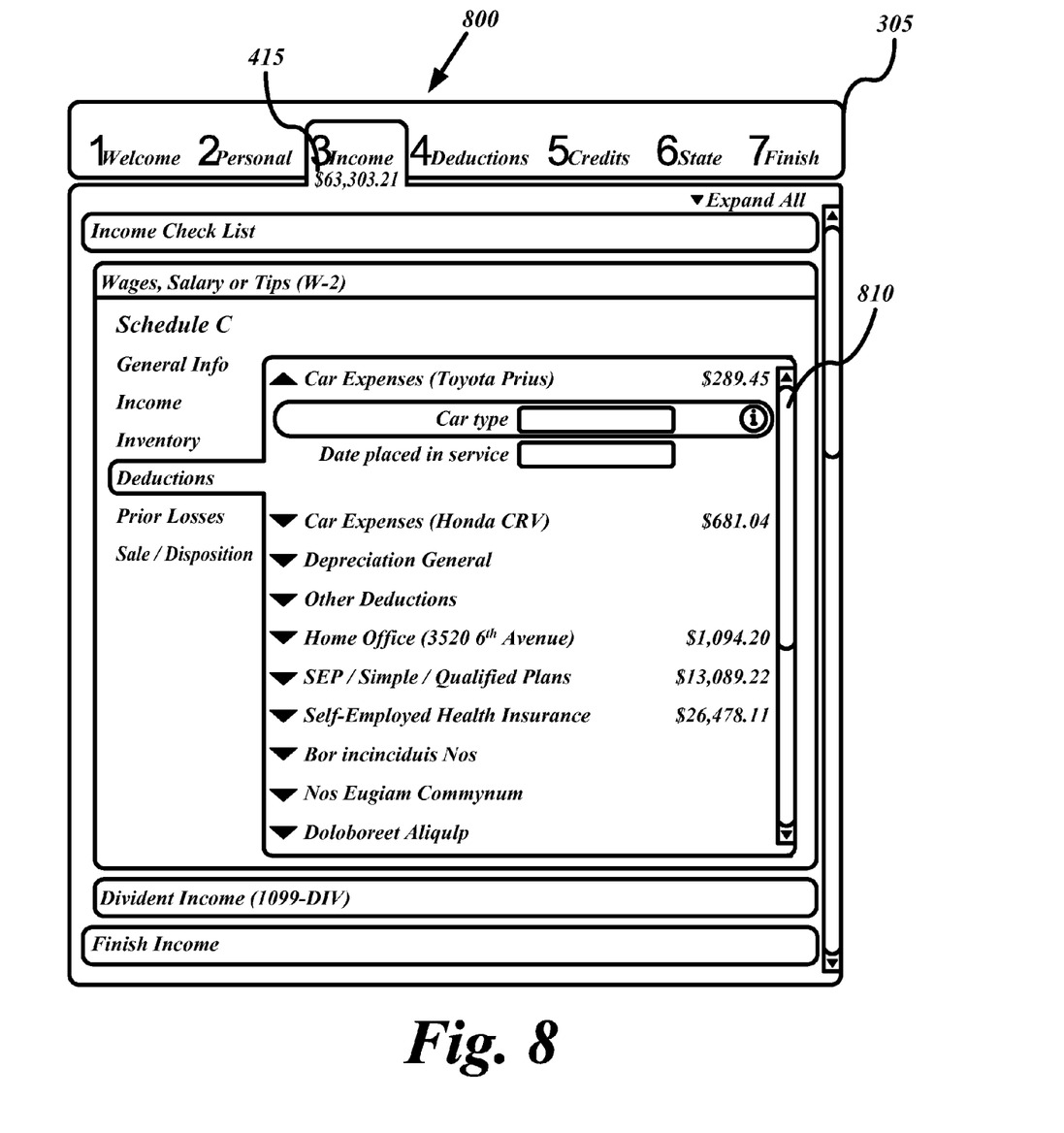
FIG. 8 shows a screenshot demonstrating the use of nested accordions in an embodiment.

FIG. 8 shows a screenshot 800 demonstrating the use of nested accordions in one embodiment. As shown, the user has entered information in the Wages, Salary or Tips accordion of the income tab 415. In the income tab 415, the user has entered an accordion called Schedule C. In the illustrated embodiment, the Schedule C accordion may include multiple accordions to include, but not limited to, general information, income, inventory, deductions, prior losses, and/or sale/disposition. In this example, the deductions nested accordion has been selected showing a series of additional accordions to enter in deduction information. By way of example, a car expenses 810 accordion is expanded, which allows for additional information to be displayed about car expenses while advantageously not overwhelming the user with non-relevant or too much information at once.

Figure 9:
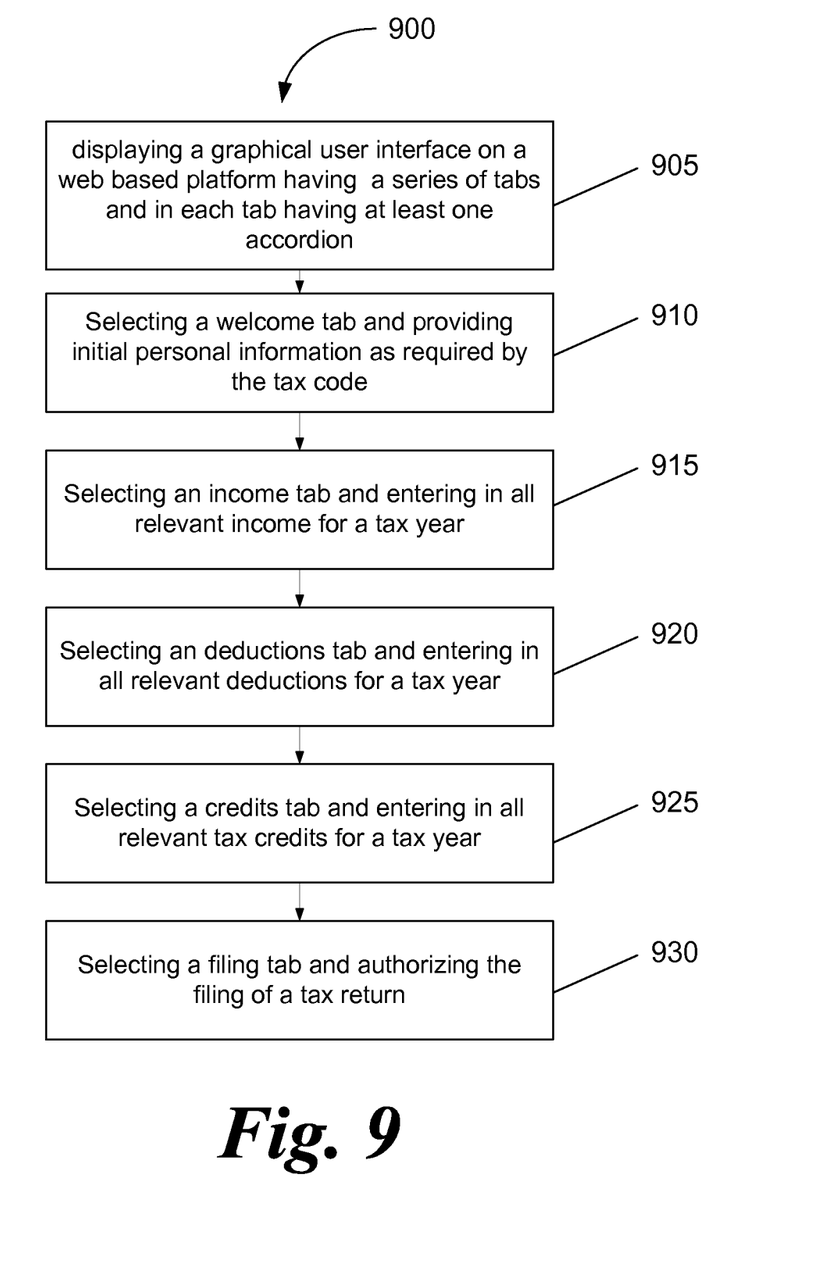
FIG. 9 shows a method for using a user interface for tax preparation.

FIG. 9 shows a method 900 for using a user interface for tax preparation. At block 905, a graphical user interface, preferably on a web based platform is displayed to a user, the graphical user interface having a series of tabs and each tab having at least one accordion found therein. Tabs are used to group related information together to allow a user to find tax related information in known categories, such as income and deductions. At block 910, a user selects a welcome tab and is prompted to enter initial personal information as required by the tax code. For tax preparation in the United States, the Internal Revenue Service (IRS) generally requires a small amount of personal data such as a name, address and filing status. In the illustrated embodiment, the method prompts for an amount information sufficient to prepare a 1040EZ tax form. At block 915, a user selects an income tab and is prompted to enter their relevant income for a desired tax year. Through the use of accordions, the necessary income as determined by the tax code is prompted for by the user. Income may include, wages, interest income, business income etc. All of the information is combined from W-2's and other such documents and is entered by the user. Once entered, the user's total income is determined. At block 920, a deductions tab is selected and the user is prompted to enter in all of the relevant deductions for the desired tax year. The user is prompted with possible deductions, which may include flyout boxes that explain each of the deductions. At block 925, the user selects a credits tab, and enters in relevant tax credits for the desired tax year. Once the available tax credits have been presented to the user, the necessary tax credit information may be entered for the desired tax year.

Figure 10:
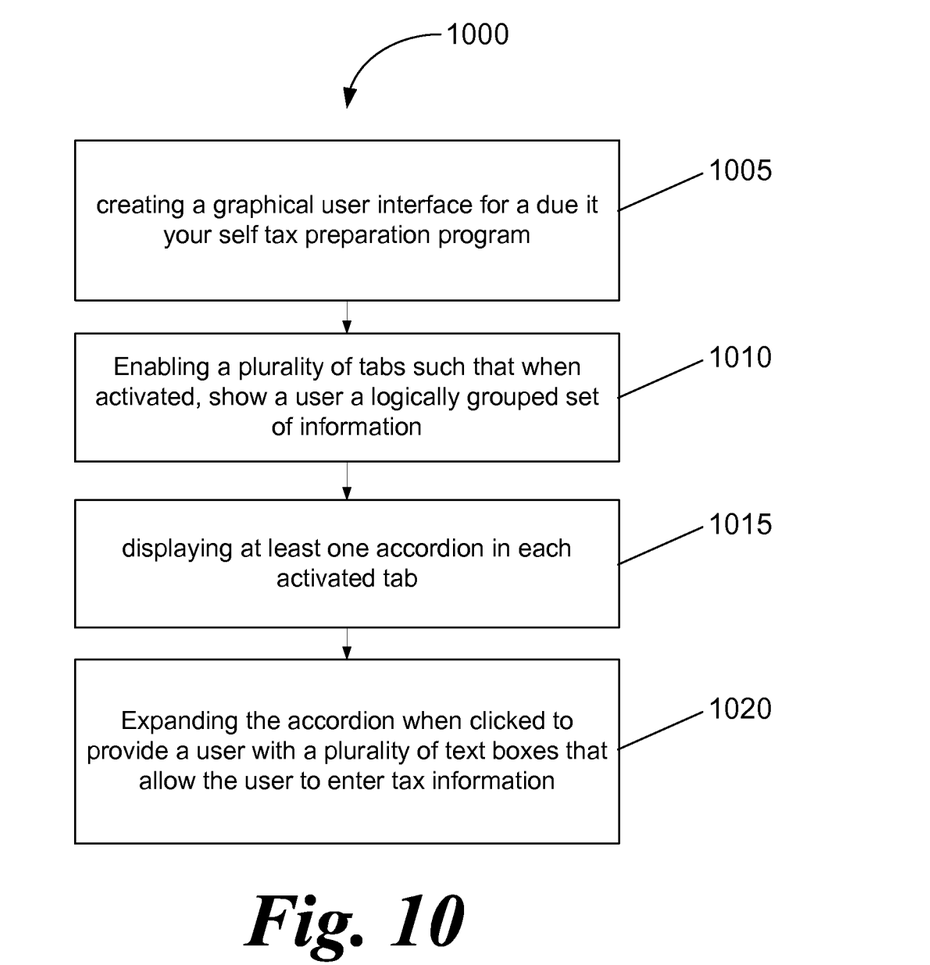
FIG. 10 shows a method for making a user interface for tax preparation.

FIG. 10 shows a method 1000 for making a user interface for tax preparation. At block 1005, a graphical user interface for a do it yourself tax preparation program is created. The graphical user interface contains a tab bar, containing a plurality of tabs used to organize information into logically similar groups. A tab and/or category is activated by a click or event with a mouse. Each tab contains at least one accordion containing another accordion or a plurality of text boxes that enable a user to provide the system with tax data. At block 1010, a plurality of tabs as described are enabled. Once the tabs are enabled, a user may navigate through the program using the tabs. At block 1015, at least one accordion is displayed. An accordion is an expandable bar that contains a specific grouping of information. For example, a wage accordion preferably includes a W-2 entry accordion and further includes all of the necessary fields as required by the W-2. At block 1020, an accordion is expanded when clicked to provide a user with a plurality of text boxes that allow the user to enter tax information. Inside each accordion is a series of text boxes which are comprised of a title, an input box and a flyout which helps a user to enter in the correct information in the correct box.

While a preferred embodiment of the invention has been illustrated and described, as noted above, many changes can be made without departing from the spirit and scope of the invention. For example, while the tax data calculations have been primarily described herein as being performed by the engine 270, all or some of these calculations may be performed by the client device 210. Additionally, the user interface 310 may enable the user to choose which of the calculations (e.g., those involving particularly sensitive tax data) are to be performed exclusively by the client device 210. Accordingly, the scope of the invention is not limited by the disclosure of the preferred embodiment. In one embodiment, a business method comprises providing one or more of the features and/or functions described above to users free of charge over the Internet. In another embodiment, the use of the system is provided for preparation of federal tax returns free of charge, and charges are only implied for non-federal (e.g. state returns). Alternatively, use for federal returns is charged, and for others is free of charge. Instead, the invention should be determined entirely by reference to the claims that follow.

The embodiments of the invention in which an exclusive property or privilege is claimed are defined as follows:

1. A non-transitory computer-readable medium having computer executable instructions stored thereon that, when executed by a computer, enable the computer to perform steps comprising:

generating a graphical user interface (GUI) for a tax preparation program;

enabling within the GUI, at least a first and a second user-selectable tab, with the first tab related to a first tax topic and containing a first set of accordions associated with the first tax topic, and the second tab related to a second tax topic and containing a second set of accordions associated with the second tax topic, wherein each accordion of the first and second sets of accordions may be expanded to enable a taxpayer user to enter in a plurality of fields tax-related information for completing a tax return;

receiving, from the taxpayer user, a selection of the first user-selectable tab;

in response to the receiving a selection of the first user-selectable tab, presenting via the GUI first and second accordions associated with the first user-selectable tab, wherein the first accordion presents a first tax sub-topic for selection by the taxpayer user, and the second accordion presents a second tax sub-topic for selection by the taxpayer user, wherein each of the first and second tax sub-topics is logically associated with the first tax topic related to the selected first user-selectable tab, and wherein the second user-selectable tab remains viewable by the taxpayer user on the GUI during the presenting of said first and second accordions;

receiving a selection by the taxpayer user of the first accordion presenting the first tax sub-topic;

presenting, via the GUI and in response to the taxpayer user's selection of the first accordion, at least one first field for entry of tax-related information by the taxpayer user, wherein during presenting of the at least one first field, the second tax sub-topic presented by the second accordion remains viewable by the taxpayer on the GUI;

receiving, from the taxpayer user, entry of a first portion of the tax-related information in the at least one first field presented in response to the taxpayer user's selection of the first accordion;

receiving a selection by the taxpayer user of the second accordion;

presenting, via the GUI, and in response to the taxpayer user's selection of the second accordion, at least one second field for entry of tax-related information by the taxpayer user, wherein during presenting of the at least one second field, the first tax sub-topic presented by the first accordion remains viewable by the taxpayer user on the GUI;

receiving, from the taxpayer user, entry of a second portion of the tax-related information in the at least one second field presented in response to the taxpayer user's selection of the second accordion;

presenting, via the GUI, a first accordion summary information that summarizes the first portion of the tax-related information entered in the at least one first field, and a second accordion summary information that summarizes the second portion of the tax-related information entered in the at least one second field; and presenting, via the GUI, a first tab summary information that summarizes the first accordion summary information and the second accordion summary information, wherein the first tab summary information is on or proximate to the first tab, and wherein the first tab summary information, the first accordion summary information, and the second accordion summary information are simultaneously viewable during the selection of the first tab.

2. The medium of claim 1, wherein the first accordion summary information is on or proximate to the first accordion, such that the taxpayer user may visually associate the first accordion with the first accordion summary information, and wherein the second accordion summary information is on or proximate to the second accordion, such that the taxpayer user may visually associate the second accordion with the second accordion summary information.

3. The medium of claim 1, wherein the computer executable instructions further enable the computer to perform the step of presenting, in response to an input to the GUI and by the taxpayer user, taxpayer assistance information on the GUI and viewable by the taxpayer user, wherein the taxpayer assistance information is logically associated with the first accordion and is viewable contemporaneously with the first accordion.

4. The medium of claim 3, wherein the taxpayer assistance information is presented on the GUI in a flyout box positioned proximate the first accordion.

5. The medium of claim 1, wherein the computer executable instructions further enable the computer to perform the steps of:
presenting, in response to the taxpayer user's selection of the first accordion, at least one third field for entry of tax-related information by the taxpayer user;
receiving, from the taxpayer user, entry of a third portion of the tax-related information in the at least one third field presented in response to the taxpayer user's selection of the first accordion,
wherein the at least one first and third fields are the only fields associated with the first accordion; and
presenting, in response to entry of the third portion of the tax-related information in the at least one third field, a visual indicator that all fields have been completed for the first accordion.

6. The medium of claim 1, wherein the first and second accordions extend longitudinally down the GUI.

7. The medium of claim 1, wherein the first field extends laterally from the first accordion.

8. A computer-implemented method for presenting a tax preparation program, the method comprising the steps of:
generating, via a computer processor, a graphical user interface (GUI) for a tax preparation program;
enabling, via the computer processor and within the GUI, at least a first and a second user-selectable tab, with the first tab related to a first tax topic and containing a first set of accordions associated with the first tax topic, and the second tab related to a second tax topic and containing a second set of accordions associated with the second tax topic, wherein each accordion of the first and second sets of accordions may be expanded to enable a taxpayer user to enter in a plurality of fields tax-related information for completing a tax return;
receiving, via the computer processor and from the taxpayer user, a selection of the first user-selectable tab;
in response to the receiving a selection of the first user-selectable tab, presenting, via the computer processor and within the GUI, first and second accordions associated with the first user-selectable tab, wherein the first accordion presents a first tax sub-topic for selection by the taxpayer user, and the second accordion presents a second tax sub-topic for selection by the taxpayer user, wherein each of the first and second tax sub-topics is logically associated with the first tax topic related to the selected first user-selectable tab, and wherein the second user-selectable tab remains viewable by the taxpayer user on the GUI during the presenting of said first and second accordions;
receiving, via the computer processor, a selection by the taxpayer user of the first accordion presenting the first tax sub-topic;
presenting, via the computer processor and within the GUI, and in response to the taxpayer user's selection of the first accordion, at least one first field for entry of tax-related information by the taxpayer user, wherein during presenting of the at lest one first field, the second tax sub-topic presented by the second accordion remains viewable by the taxpayer on the GUI;
receiving, via the computer processor and from the taxpayer user, entry of a first portion of the tax-related information in the at least one first field presented in response to the taxpayer user's selection of the first accordion;
receiving, via the computer processor, a selection by the taxpayer user of the second accordion;
presenting, via the computer processor and within the GUI, and in response to the taxpayer user's selection of the second accordion, at least one second field for entry of tax-related information by the taxpayer user, wherein during presenting of the at least one second field, the first tax sub-topic presented by the first accordion remains viewable by the taxpayer user on the GUI;
receiving, via the computer processor and from the taxpayer user, entry of a second portion of the tax-related information in the at least one second field presented in response to the taxpayer user's selection of the second accordion;
presenting, via the computer processor and within the GUI, a first accordion summary information that summarizes the first portion of the tax-related information entered in the at least one first field, and a second accordion summary information that summarizes the second portion of the tax-related information entered in the at least one second field; and
presenting, via the computer processor and within the GUI, a first tab summary information that summarizes the first accordion summary information and the second accordion summary information, wherein the first tab summary information is on or proximate to the first tab, and wherein the first tab summary information, the first accordion summary information, and the second accordion summary information are simultaneously viewable during the selection of the first tab.

9. The computer-implemented method of claim 8, wherein the first accordion summary information is on or proximate to the first accordion, such that the taxpayer user may visually associate the first accordion with the first accordion summary information, and
wherein the second accordion summary information is on or proximate to the second accordion, such that the taxpayer user may visually associate the second accordion with the second accordion summary information.

10. The computer-implemented method of claim 8, further comprising the step of presenting, via the computer processor and in response to an input to the GUI and by the taxpayer user, taxpayer assistance information on the GUI and viewable by the taxpayer user, wherein the taxpayer assistance information is logically associated with the first accordion and is viewable contemporaneously with the first accordion.

11. The computer-implemented method of claim 8, wherein the taxpayer assistance information is presented on the GUI in a flyout box positioned proximate the first accordion.

12. The computer-implemented method of claim 8, further comprising the steps of:
presenting, in response to the taxpayer user's selection of the first accordion, at least one third field for entry of tax-related information by the taxpayer user;
receiving, from the taxpayer user, entry of a third portion of the tax-related information in the at least one third field presented in response to the taxpayer user's selection of the first accordion,
wherein the at least one first and third fields are the only fields associated with the first accordion; and presenting, in response to entry of the third portion of the tax-related information in the at least one third field, a visual indicator that all fields have been completed for the first accordion.

13. The computer-implemented method of claim 8, wherein the first and second accordions extend longitudinally down the GUI.

14. The computer-implemented method of claim 8, wherein the first field extends laterally from the first accordion.

* * * * *